(12) United States Patent
Nakayama et al.

(10) Patent No.: US 8,175,800 B2
(45) Date of Patent: May 8, 2012

(54) ROUTE GUIDANCE SYSTEM AND ROUTE GUIDANCE METHOD

(75) Inventors: Takaaki Nakayama, Okazaki Aichi (JP); Shino Oonishi, Okazaki Aichi (JP); Kensuke Takeuchi, Okazaki Aichi (JP); Daisuke Tanizaki, Okazaki Aichi (JP); Kiyohide Kato, Okazaki Aichi (JP)

(73) Assignee: Aisin AW Co., Ltd. (JP)

( * ) Notice: Subject to any disclaimer, the term of this patent is extended or adjusted under 35 U.S.C. 154(b) by 553 days.

(21) Appl. No.: 11/992,842

(22) PCT Filed: Nov. 29, 2006

(86) PCT No.: PCT/JP2006/323831
§ 371 (c)(1),
(2), (4) Date: Sep. 2, 2009

(87) PCT Pub. No.: WO2007/063906
PCT Pub. Date: Jun. 7, 2007

(65) Prior Publication Data
US 2009/0319171 A1 Dec. 24, 2009

(30) Foreign Application Priority Data
Nov. 30, 2005 (JP) .................. 2005-346668

(51) Int. Cl.
*G01C 21/34* (2006.01)
(52) U.S. Cl. ........................................ 701/410
(58) Field of Classification Search .......... 701/117–119, 701/201, 206, 209, 211, 213, 408, 410, 413, 701/418, 419, 441
See application file for complete search history.

(56) References Cited

U.S. PATENT DOCUMENTS

| | | | |
|---|---|---|---|
| 5,410,486 A | * | 4/1995 | Kishi et al. ............. 701/211 |
| 5,736,941 A | | 4/1998 | Schulte et al. |
| 5,904,728 A | * | 5/1999 | Tamai et al. ............ 701/211 |
| 6,002,981 A | | 12/1999 | Kreft |

(Continued)

FOREIGN PATENT DOCUMENTS

| | | |
|---|---|---|
| EP | 0 874 221 A2 | 10/1998 |
| EP | 1473544 | 11/2004 |
| JP | 06-295399 | 10/1994 |

(Continued)

OTHER PUBLICATIONS

Decision on Grant issued in Russian application No. 2008109757/28(010550), Feb. 25, 2010, 8 pages.

*Primary Examiner* — Kim T Nguyen
(74) *Attorney, Agent, or Firm* — Bacon and Thomas, PLLC

(57) ABSTRACT

A route guidance system includes a current position detection section, a route search section, and a guidance section. The guidance section includes a branch computation section computes the number of branches between a host vehicle location and a guidance location along a specified route. A point guidance section executes route guidance based on the computed number of the branches. The number of branches between the host vehicle location and the guidance location is computed, and the route guidance is executed based on the computed number of the branches, so it is possible to recognize the guidance location simply by counting the number of the branches, regardless of the number of traffic signals that exist between the host vehicle location and the guidance location.

7 Claims, 9 Drawing Sheets

U.S. PATENT DOCUMENTS

| | | | |
|---|---|---|---|
| 6,084,543 A * | 7/2000 | Iizuka | 342/357.31 |
| 6,253,153 B1 * | 6/2001 | Kantani et al. | 701/209 |
| 7,219,010 B2 | 5/2007 | Katou | |
| 2004/0044471 A1 | 3/2004 | Tsuge et al. | |

FOREIGN PATENT DOCUMENTS

| | | |
|---|---|---|
| JP | 10-300502 | 11/1998 |
| JP | 2004-053441 | 2/2004 |
| WO | 95/04340 A1 | 2/1995 |

* cited by examiner

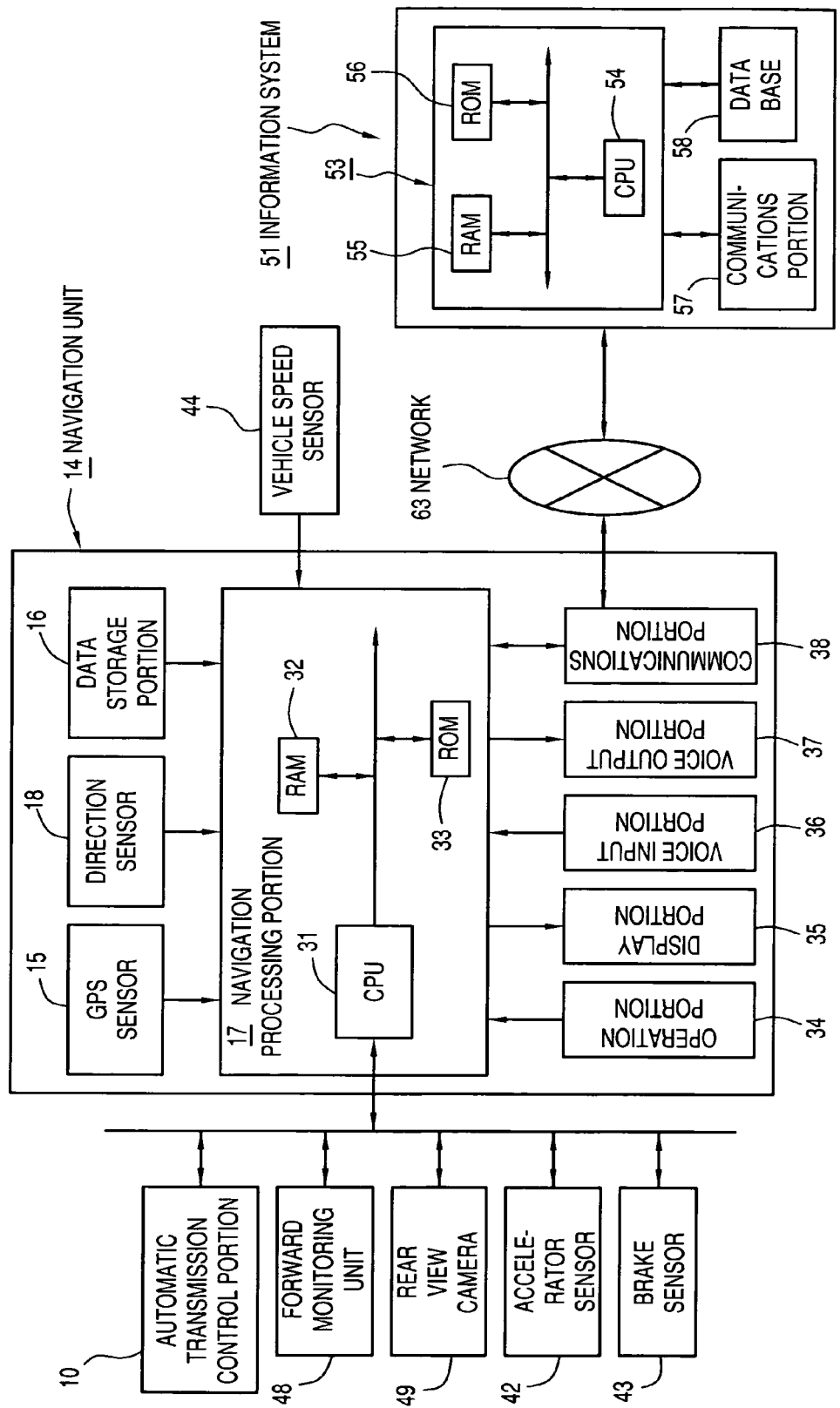

ROUTE GUIDANCE SYSTEM AND ROUTE GUIDANCE METHOD

TECHNICAL FIELD

The present invention relates to a route guidance system and a route guidance method.

BACKGROUND ART

In a conventional navigation system, the current location of a vehicle that is a host vehicle is detected by a Global Positioning System (GPS) device, for example. Map data is read out from a data storage portion, and a map screen is formed on a display unit. The host vehicle current location, a map of the area surrounding the host vehicle location, and the like are displayed on the map screen. Therefore, a driver, can drive the vehicle guided by the host vehicle location displayed on the map screen.

When the driver inputs a destination and sets search conditions, route search processing is executed based on the search conditions, and a route to the destination from a point of departure, which is expressed as the current location, is determined utilizing the map data. A specified route is displayed on the map screen together with the host vehicle location. Guidance along the specified route, that is, route guidance, is executed. Therefore, the driver is assisted in driving the vehicle along the specified route that is displayed.

In route guidance, when there is a specific intersection at which the vehicle must turn right or left, route guidance is executed, such as by voice output, for example, before the vehicle arrives at the intersection, which is termed a "guidance intersection". In order for route guidance to be executed, one or more route guidance points are set at locations at predetermined distances in advance of the guidance intersection along the specified route. When the vehicle arrives at the route guidance points, route guidance with a content that is set in advance for each of the route guidance points is output by voice. (Refer to Patent Document 1, for example.)

[Patent Document 1] Japanese Patent Application Publication No. JP-A-6-295399

DISCLOSURE OF THE INVENTION

However, in the conventional navigation system, it is possible that the route guidance for the guidance intersection will be is expressed at each route guidance point in terms of the number of traffic signals between the host vehicle location and the guidance intersection, such as by a voice message "Turn left at the third traffic signal," for example. But because all of the traffic signals between the host vehicle location and the guidance intersection are counted, if there are two traffic signals at a single intersection, or if there is a traffic signal that provides advance notice of a traffic signal at an intersection, it is difficult for a driver to know which traffic signals to count, so it is possible that the driver might fail to recognize the guidance intersection.

Also, an intersection with no traffic signal is not counted, so in a case where an intersection without a traffic signal exists between the host vehicle location and the guidance intersection, it is possible that the driver will fail to recognize the guidance intersection.

It is an object of the present invention to provide a route guidance system and a route guidance method that solve the above-described a problem of the conventional navigation system by making it possible for a driver to recognize a guidance intersection correctly.

Accordingly, the present invention provides a route guidance system and route guidance method which includes a current location detection portion that detects the current location of the host vehicle; a route search processing means that searches for a route to a destination, based on the host vehicle location, and for specifying the route determined by search as a specified route; and a guidance processing means that sets a route guidance point at a specified location on the specified route in advance of a guidance location, e.g. intersection, and that executes route guidance for the guidance location when the vehicle arrives at the route guidance point.

The guidance processing means includes a branch number computation means that computes the number of road branches between the host vehicle location and the guidance location, a point guidance processing means that executes route guidance based on the computed number of branches, a guidance suspension conditions determination processing means for determining whether or not guidance suspension conditions are applicable, and a guidance suspension processing means for, responsive to a determination that the guidance suspension conditions are applicable, suspending the route guidance based on the number of branches.

According to the present invention, the number of the road branches between the host vehicle location and the guidance location is computed, and the route guidance is executed based on the computed number of the branches, so it is possible to recognize the guidance point simply by counting the number of the branches, regardless of the number of traffic signals that exist between the host vehicle location and the guidance location. Therefore, the driver will not fail to recognize the guidance location.

DESCRIPTION OF THE REFERENCE NUMERALS

10 AUTOMATIC TRANSMISSION CONTROL PORTION
14 NAVIGATION UNIT
15 GPS SENSOR
31, 54 CPU
51 INFORMATION CENTER
63 NETWORK
crj INTERSECTION
h1 ROUTE GUIDANCE POINT
pr HOST VEHICLE LOCATION POSITION
ri ROAD
Rt SPECIFIED ROUTE
sgk TRAFFIC SIGNAL

DESCRIPTION OF PREFERRED EMBODIMENTS

Preferred embodiments of the present invention will be explained below with reference to the drawings.

Figure 1B:
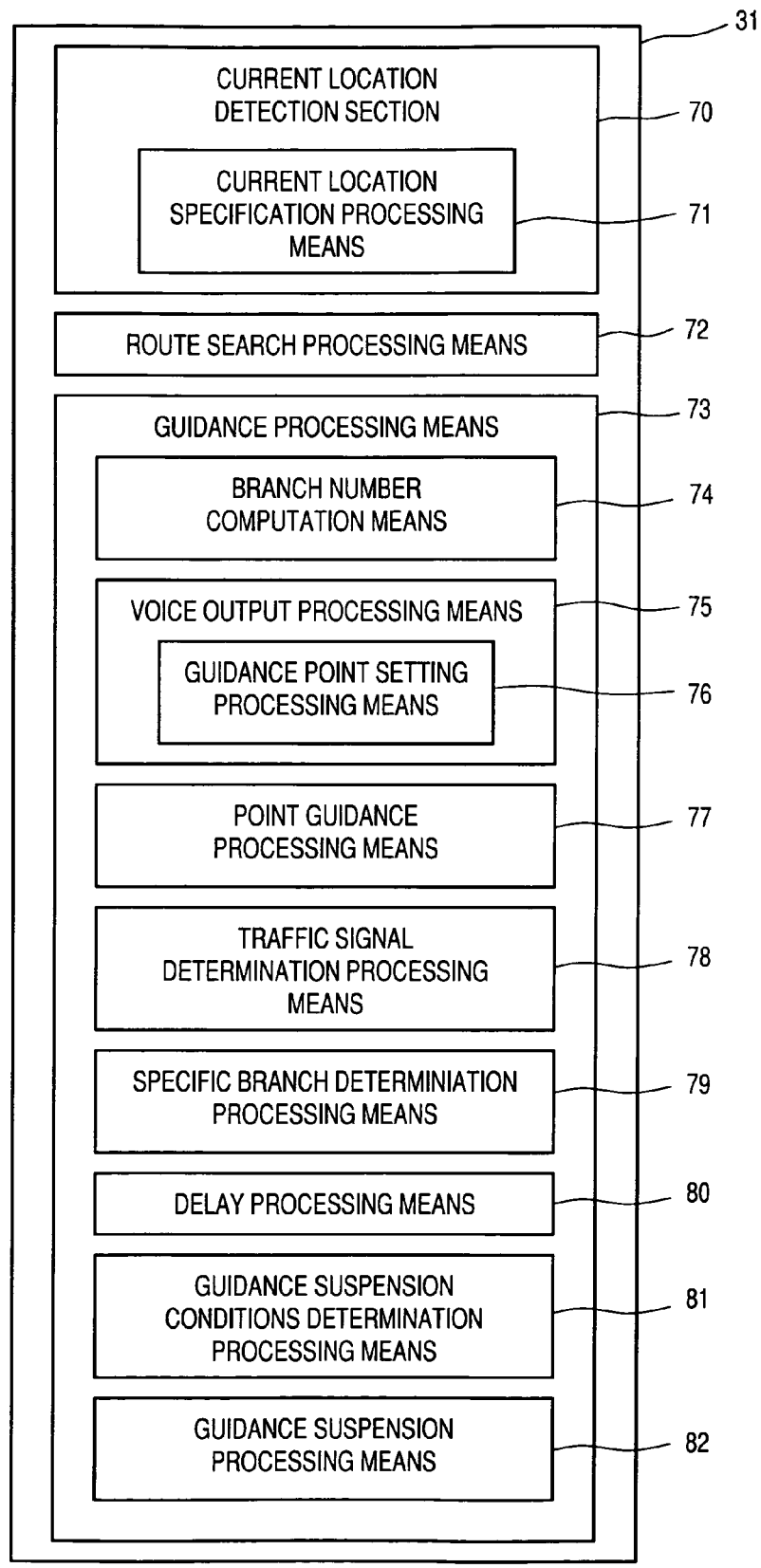
FIG. 1 is a block diagram of a navigation system according to a first embodiment of the present invention.

FIG. 1 is a diagram showing a navigation system according to a first embodiment of the present invention.

In FIG. 1, the reference numeral 10 denotes an automatic transmission control portion that serves as a power train controller. The automatic transmission control portion 10 controls a power train that shifts gears to at a prescribed gear ratio, such as a continuously variable transmission (CVT), a stepped transmission (automatic transmission), an electric drive unit, or the like.

The reference numeral 14 denotes a navigation unit that serves as an information terminal, such as an on-board unit. The reference numeral 63 denotes a network, and the reference numeral 51 denotes an information center that serves as an information provider. The navigation system is made up of the automatic transmission control portion 10, the navigation unit 14, the network 63, the information center 51, etc.

The navigation unit 14 includes a Global Positioning System (GPS) sensor 15, a data storage portion 16, a navigation processing means 17, a direction sensor 18, an operation portion 34, a display portion 35, a voice input portion 36, a voice output portion 37, and a communications portion 38. The GPS sensor 15 serves as a current location detection portion that detects the current location of the host vehicle. The data storage portion 16 serves as an information storage portion where map data and various other types of data are stored. The navigation processing means 17 carries out various types of computational processing, such as navigation processing and the like, based on input information. The direction sensor 18 serves as a direction detection portion that detects the vehicle's direction. The operation portion 34 serves as a first input portion enabling the driver to make a prescribed input. The display 35 serves as a first output portion that displays images on a screen to convey various types of information to the driver. The voice input portion 36 serves as a second input portion for input by voice. The voice output portion 37 serves as a second output portion that uses voice to convey various types of information to the driver. The communications portion 38 serves as a transmitting and receiving portion that functions as a communications terminal. The GPS sensor 15, the data storage portion 16, the direction sensor 18, the operation portion 34, the display portion 35, the voice input portion 36, the voice output portion 37, and the communications portion 38 are connected to the navigation processing means 17.

Also connected to the navigation processing means 17 are the automatic transmission control portion 10, a forward monitoring unit 48, a rear view camera (rear monitoring camera) 49, an accelerator sensor 42, a brake sensor 43, a vehicle speed sensor 44, and the like. The forward monitoring unit 48 is installed at a prescribed location on the front end of the vehicle and monitors the area in front of the vehicle. The rear view camera 49 is installed at a prescribed location on the rear end of the vehicle and serves as a photography unit that captures images of the area behind the vehicle and as a rear monitoring unit. The accelerator sensor 42 serves as an engine load detection portion that detects the driver's operation of the accelerator pedal based on the accelerator angle. The brake sensor 43 serves as a braking detection portion that detects the driver's operation of the brake pedal based on the amount by which the pedal is depressed. The vehicle speed sensor 44 serves as a vehicle speed detection portion that detects the vehicle speed. Note that the accelerator sensor 42, the brake sensor 43, and the like make up an operation information detection portion that detects information on the operation of the vehicle by the driver.

The GPS sensor 15 detects the vehicle's current location, as well as the time, by receiving radio signals from a satellite. In this embodiment, the GPS sensor 15 is used as the current location detection portion, but a distance sensor, a steering sensor, an altimeter, or the like not shown in FIG. 1 can also be used individually or in combination, instead of the GPS sensor 15. A gyroscopic sensor, a geomagnetic sensor, or the like can be used as the direction sensor 18. While this embodiment includes the direction sensor 18, the vehicle speed sensor 44, and the like, where the GPS sensor functions to detect the host vehicle direction, the vehicle speed, and the like, the direction sensor 18, the vehicle speed sensor 44, and the like are not necessary.

The data storage portion 16 is provided with a map data base made up of map data files, and stores map data therein. The map data includes intersection data pertaining to intersections, node data pertaining to nodes, road data pertaining to road links, search data that is processed for searching, facilities data pertaining to facilities, and the like, as well as local feature data pertaining to local features.

The local features are displays installed on or near the road to provide various kinds of driving-related information and guidance to drivers. These displays include marking lines, indicators, pedestrian crosswalks, manholes, traffic signals, and the like. Marking lines include stop lines to stop vehicles, lane demarcation lines that delineate the boundaries of lanes, parking space demarcation lines that delineate parking spaces, and the like. Indicators include lane differentiation indicators in the form of arrows in each lane to indicate the direction of travel, and guidance indicators, such as the word "Stop" and the like, which warn of approach to a location where the vehicle must stop momentarily. Guidance indicators may also include phrases such as "To (place name)" and the like, which provide directional guidance. The local feature data include location information, which describes the location of each feature in terms of coordinates and the like, and image information, which shows an image of each feature. Note that for locations where the vehicle must stop momentarily, the information includes locations where vehicles enter main roads from side roads, crossings, intersections with flashing red lights, and so on.

The road data pertaining to the lanes includes include lane data, including lane numbers that are assigned to each lane on a road, lane position information, and the like. Data is also stored in the data storage portion 16 in order for the voice output portion 37 to output prescribed information.

A statistical data base made up of statistical data files and a driving history data base made up of driving history data files are also stored in the data storage section 16. The statistical data in the statistical data files and the driving history data in the driving history data files are stored as actual results data.

The statistical data is actual traffic information obtained in the past, that is, historical information. Traffic information provided in the past by traffic information centers and the like (not shown in FIG. 1) as information providers, such as the Vehicle Information and Communication System (VICS) center and the like, traffic census information, which is data on traffic volumes from traffic censuses provided by the Ministry of Land Infrastructure and Transport, and road timetable information and the like, also provided by the Ministry of Land Infrastructure and Transport, are used individually or in combination. The statistical data is created by refining the information as necessary, then carrying out statistical processing. Congestion forecasting information for forecasting congestion and other purposes can be added. When the statistical data is created, detailed conditions are added to the historical information, such as information on dates and times, days of the week, weather, various types of events, seasons of the year, and facilities (the presence or absence of department stores, supermarkets, and the like).

Also, the data items in the statistical data are made up of link numbers for various road links, direction flags to indicate the direction of travel, information classifiers that show the type of information, degrees of congestion at specific times, link travel times that describe the times required to traverse on various road links at specific times, and data on link travel times averaged for each day of the week (for example, average time for Wednesday).

The driving history data is made up of information collected by the information center 51 from a plurality of vehicles, i.e., the host vehicle and other vehicles, and represents actual driving records of vehicle travel, i.e. actual history information that describes driving records, and based on the driving data, probe data that is computed and accumulated.

The data items in the driving history data are made up of link travel times categorized for specific times when vehicles traveled on each road link, degrees of congestion at specific times when vehicles traveled on each road link, and the like. Note that the driving history data can be added to the statistical data. In this embodiment, the degree of congestion is used as a congestion indicator that expresses the scale of congestion. Congestion, crowding, and non-congestion are expressed separately.

In order to store the various types of data, the data storage portion 16 includes a disk not-shown in FIG. 1, such as a hard drive, a CD, a DVD, an optical disk, or the like. The data storage portion 16 also includes a read/write head or the like for reading and writing the various type of data. It is also possible to use a memory card or the like for the data storage portion 16. The external storage device may be any of various disks, a memory card, or the like.

In this embodiment, the map data base, the statistical data base, the driving history data base, and the like are built into the data storage section 16, but the map data base, the statistical data base, the driving history data base, and the like can also be located in the information center 51.

The navigation processing means 17 includes a CPU 31, a RAM 32, a ROM 33, and a flash memory that is not shown in FIG. 1. The CPU 31 serves as a control device that controls the entire navigation unit 14 and as a computation device. The RAM 32 is used as a working memory when the CPU 31 performs various types of computational processing. The ROM 33 contains a control program, as well as various types of programs that search for routes to destinations, execute route guidance, and so on. The flash memory is used to store various types of data, programs, and the like. An internal storage device is formed by the RAM 32, the ROM 33, and the flash memory.

In this embodiment, various types of programs can be stored in the ROM 33, and various types of data can be stored in the data storage portion 16, but programs, data, and the like can also be stored on a disk or the like. In that case, programs and data that are read from the disk or the like can be written to the flash memory. The programs and data can therefore be updated by replacing the disk. The control programs and data of the automatic transmission control portion 10 can also be stored on the disk. The programs and data can be received through the communications portion 38 and written into the flash memory in the navigation processing means 17.

The operation portion 34 executes such tasks as correcting the current location when the vehicle starts to move, inputting a departure point and a destination, inputting points to be passed through, and operating the communications portion 38, all according to the driver's operations. The operation portion 34 can include a keyboard, mouse, or the like (not shown in FIG. 1) installed independently of the display portion 35. The operation portion 34 can also be a touch panel that is capable of receiving prescribed input operations by touching or clicking on an image, such as various types of keys, switches, buttons, and the like that are displayed as images on a screen that is formed by the display portion 35.

The various screens that are formed on the display portion 35 can display the vehicle's current location and direction; maps, the specified route, guidance information along the specified route, traffic information, and the like; the distance to the next intersection on the specified route and the direction of travel at the next intersection. The screens can also display operation guidance, operation menus, and key guidance for the image operation portion, the operation portion 34, the voice input portion 36, and the like. The screens can also display programs and the like that are broadcast by FM multiplex.

The voice input portion 36 includes a microphone for input of required information by voice. The voice output portion 37 includes a voice synthesizing unit and a speaker, which are not shown in FIG. 1. The voice output portion 37 outputs the specified route, the guidance information, the traffic information, and the like by means of a voice that is synthesized by the voice synthesizing unit, for example.

The communications portion 38 includes a beacon receiver and an FM receiver for receiving various types of information, such as current traffic information that is transmitted from the traffic information center, general information, and the like. The beacon receiver receives the information as radio wave signals or optical signals via radio wave beacons or optical beacons installed along the road. The FM receiver receives the information as FM multiplex broadcasts via an FM broadcast station. The traffic information includes congestion information, regulatory information, parking space information, traffic accident information, service area congestion status information, and the like. The general information includes news, weather forecasts, and the like. The beacon receiver and the FM receiver are combined in a single VICS receiver, but they can also be installed separately.

The traffic information contains an information classification that defines the type of information, a grid number that specifies a grid section, a link number that specifies a road link connecting two points (e.g., two intersections) and also distinguishes between inbound and outbound lanes of the road, and link information or the like that constitutes the content of the information that is provided for the corresponding link number. For example, if the traffic information is congestion information, the link information is made up of congestion leading edge data, which gives the distance from the start of the road link to the leading edge of the congestion; the degree of congestion; the length of congestion, which gives the distance from the leading edge of the congestion to its trailing edge; the link travel required time, which gives the time required to travel the road link; and so on.

The communications portion 38 can also receive map data, statistical data, driving history data, and the like, as well as various types of the information such as traffic information and general information, via the network 63.

For that reason, the information center 51 includes a server 53, a communications portion 57 connected to the server 53, a data base 58 that serves as an information storage portion, and so on. The server 53 includes a CPU 54, a RAM 55, and a ROM 56. The CPU 54 serves as a control device and as a computation device. The data base 58 stores the same type of data that is stored in the data storage portion 16, such as map data, statistical data, and driving history data, for example. The information center 51 can also provide in real time various types of information, such as current traffic information that is transmitted from the traffic information center and general information, as well as driving history data that is collected from a plurality of vehicles (the host vehicle and other vehicles).

The forward monitoring unit 48 is a radar, such as a laser radar, a millimeter-wave radar, an ultrasonic sensor or the combination of a radar of the like and an ultrasonic sensor or the like. The forward monitoring unit 48 monitors a vehicle that is traveling ahead of the host vehicle, and also monitors temporary momentary stopping points, obstacles, and the like. The forward monitoring unit 48 also detects the relative speed, which is the vehicle speed relative to the vehicle ahead, the approach speed in relation to temporary stopping points, the approach speed in relation to obstacles, the distance to the vehicle ahead, the time to the vehicle ahead, and the like, all as information for the area around the host vehicle.

The rear view camera 49 is a CCD device and is mounted so that its optical axis tilts downward in order to monitor the area behind the vehicle. In addition to local features, the subjects for image capture include a vehicle traveling behind the vehicle, buildings and other structures on the roadside, and the like. The rear view camera 49 generates image data of the photographed subjects and sends the data to the CPU 31. The CPU 31 reads the image data and executes image processing with the image data to recognize individual photographed subjects as recognized objects. In this embodiment, a CCD device is used as the rear view camera 49, but a C-MOS device or the like can be used instead of the CCD device.

Note that in the navigation system, the control portion 10, the navigation processing means 17, the CPUs 31, 54, the server 53, and the like function as computers, independently or in combinations of two or more, and execute computational processing based on various types of programs and data. Also, storage media include the data storage portion 16, the RAMs 32, 55, the ROMs 33, 56, the data base 58, the flash memories, and the like. Microprocessors can be used as computation devices in place of the CPUs 31, 54.

Next, the basic operation of the navigation system described above will be explained.

First, when the driver operates the operation portion 34 and the navigation unit 14 starts up, a navigation initialization processing means (not shown in FIG. 1) of the CPU 31 executes navigation initialization processing, reads the current location of the host vehicle detected by the GPS sensor 15, reads the host vehicle direction detected by the direction sensor 18, and initializes various types of data. Next, a matching processing means (current location detection section 70) of the CPU 31 executes a matching process and specifies the current location by judging on which road link the current position lies, based on the track of the current location that has been read, the shapes and arrangement of the various road links that make up the roads in the vicinity of the current position, and so on.

Also, in this embodiment, the matching processing means further defines the current location based on the positions of various local features that are subjects photographed by the rear view camera 49.

For the foregoing purpose, an image recognition processing means of the CPU 31, not shown in FIG. 1, executes image recognition processing, reading in image data from the rear view camera 49 and recognizing a local feature in an image represented by the image data. Also, a distance computation processing means of the CPU 31, not shown in FIG. 1, executes distance computation processing, computing a distance from the rear view camera 49 to the actual local feature, based on the position of the local feature in the image. A current location specification processing means 71, included in the matching processing means, executes current location specification processing, reading in the distance to the local feature and reading local feature data from the data storage portion 16 to obtain the coordinates of the local feature, then specifying the current location based on the coordinates and the distance from the local feature.

A lane detection processing means of the CPU 31, not shown in FIG. 1, executes lane detection processing, detecting the lane in which the host vehicle is currently driving, that is, the current driving lane, by checking a local feature that has been recognized based on the image data against the local feature data read from the data storage portion 16.

The lane detection processing means can detect the current driving lane by reading the sensor output from the geomagnetic sensor, judging whether or not a detected object consisting of a strongly magnetic object, such as a manhole cover or the like, is present in a given lane on the road, based on the sensor output, and then detecting the driving lane based on that judgment. The lane detection processing means can also detect the current driving lane by using the highly accurate GPS sensor 15 to detect the current location with high accuracy, then detecting the lane based on the current location detection result. As necessary, the lane detection processing means can also detect the current driving lane by combining the geomagnetic sensor output, the current location, and the like at the same time that it executes image processing of the en image data to recognize marking lines.

A basic information acquisition processing means of the CPU 31, not shown in FIG. 1, executes basic information acquisition processing, obtaining map data from the data storage portion 16 or receiving map data from the information center 51 via the communications portion 38. When map data is obtained from the information center 51 or the like, the basic information acquisition processing means writes the received data into the flash memory.

A display processing means of the CPU 31, not shown in FIG. 1, executes a display routine to form various types of screens on the display portion 35. For example, a map display processing means of the display processing means executes a map display routine to form a map display screen on the display portion 35 that displays the current host vehicle location and the host vehicle direction, while also displaying maps of the surrounding areas.

Therefore, the driver is able to drive the vehicle according to the map, the host vehicle location, and the host vehicle direction.

When the driver operates the operation portion 34 to input a destination, a destination setting processing means of the CPU 31, not shown in FIG. 1, executes a destination setting routine to set the destination. The departure point can also be input and set as necessary. It is also possible to register a given location in advance, then set the registered location as the destination. When the driver operates the operation portion 34 to input a search condition, a search condition setting processing means of the CPU 31, not shown in FIG. 1, executes a search condition setting routine to set the search condition.

When the destination and search condition are set in this manner, a route search processing means 72 of the CPU 31, executes route search processing. The route search processing means 72 reads the current location, the destination, the search condition, and the like, and reads search data from the data storage portion 16. Based on the current location, the destination, the search data, and the like, the route search processing means searches for a route from the departure point, expressed as the current location, to the destination, according to the search condition. The route search processing means then outputs route data that describes the specified route. The specified route is the route for which the total of the link costs assigned to the road links is the lowest.

Also, if the road has a plurality of lanes and if the current driving lane has been detected, the route search processing means 72 specifies individual lanes in the specified route. In that case, the lane numbers of the driving lanes are included in the route data.

Alternatively, route search processing can be executed at the information center 51 in which case, the CPU 31 transmits the current location, the destination, the search condition, and the like to the information center 51 via the network 63. When the information center 51 receives the current position, the destination, and the search condition, a route search processing means of the CPU 54, not shown in FIG. 1, executes route search processing in the same manner as CPU 31. The route search processing means reads search data from the data base 58 and, based on the current location the destination and the search data, searches for a route from the departure point to the destination, according to the search condition. The route search processing means outputs route data that describes the specified route. Next, a transmission processing means of the CPU 54, not shown in FIG. 1, executes a data transmission routine to transmit the route data to the navigation unit 14 via the network 63.

Next, a guidance processing means 73 of the CPU 31 executes a guidance routine to provide route guidance. For this purpose, a route display processing means of the guidance processing means 73 executes route display processing, reading the route data and displaying the specified route on the map screen according to the route data.

Incidentally, when the vehicle must turn right or left at a prescribed intersection, the intersection is set as a guidance location, more specifically a guidance intersection, for route guidance. For that purpose, a guidance intersection setting processing means of the guidance processing means 73 executes a guidance intersection setting routine. The guidance intersection setting processing means determines, according to the route data for the specified route, whether or not there is an intersection where the vehicle must turn right or left. If there is an intersection where the vehicle must turn right or left, the intersection is set as a guidance intersection.

When individual lanes have been specified, a recommended lane setting processing means of the guidance processing means executes a recommended lane setting routine, selecting lanes in which the vehicle should travel and setting them as the recommended lanes. For example, when the vehicle passes through a guidance intersection, the recommended lane setting processing means selects and sets a suitable lane for entering the guidance intersection and, a suitable lane for exiting the guidance intersection. Also, the route display processing means, in addition to displaying the specified route on the map screen, displays an enlarged map of the road on which the vehicle is traveling, that is, an enlarged road map, in a specified area of the map screen, and uses the enlarged road map to provide lane guidance. In this case, all of the lanes, as well as the specifically recommended lanes, are displayed on the enlarged road map.

Next, a voice output processing means 75 of the guidance processing means 73 executes a voice output routine to output route guidance by voice from the voice output portion 37. For this purpose, a route guidance point setting processing means 76 of the voice output processing means 75 executes a route guidance point setting routine to set a route guidance point at one or more locations at pre-set distances in advance of the guidance intersection on the specified route (i.e., on the side of the guidance intersection where the host vehicle is located). Point guidance processing means 77 of the guidance processing means 73 executes point guidance processing. When the vehicle arrives at a route guidance point, route guidance is provided for the guidance intersection with a content that is set in advance for each of the route guidance points, such as the distance from the host vehicle location to the guidance intersection and whether the vehicle is to turn left or right at the guidance intersection. Also, if the recommended lane has been set, a lane guidance processing means of the point guidance processing means 77 executes a lane guidance routine to provide lane guidance with a content that is set in advance for each of the route guidance points, such as each recommended lane from the host vehicle location to the guidance intersection and the recommended lane to be driven beyond the guidance intersection.

Also, an enlarged intersection map display processing means of the guidance processing means executes a routine to display an enlarged intersection map. Before the vehicle arrives at the guidance intersection, the enlarged intersection map display processing means displays an enlarged map of the guidance intersection in a specified area of the map screen and uses the enlarged intersection map to provide route guidance. In this case, a map of the area surrounding the guidance intersection, the specified route, and landmarks such as facilities and the like at the guidance intersection are displayed on the enlarged intersection map. Also, in a case where there are a plurality of lanes in the road by which the vehicle enters the guidance intersection (hereinafter called the entry road) or in the road by which the vehicle exits the guidance intersection (hereinafter called the exit road) and lane guidance is executed, the enlarged guidance point map formation processing means displays the recommended lanes on the enlarged intersection map.

It is conceivable that the route guidance for the guidance intersection might be expressed at each route guidance point in terms of the number of traffic signals between the host vehicle location position and the guidance intersection, such as by outputting a message (voice phrase) "Turn left at the third traffic signal," for example. But because all of the traffic signals between the host vehicle location and the guidance intersection are counted, if there are two traffic signals at a single intersection, or if there is a traffic signal that provides advance notice of a signal of a traffic signal at an intersection, it is difficult for a driver to know which traffic signals to count, so that the driver might fail to recognize the guidance intersection.

Also, an intersection with no traffic signal is not counted, so in a case where an intersection without a traffic signal exists between the host vehicle location and the guidance intersection, it is conceivable that the driver might fail to recognize the guidance intersection.

Therefore, in this embodiment, the route guidance for the guidance intersection is expressed at each route guidance point in terms of the number of intersections or the number of roads that exist between the host vehicle location and the guidance intersection, regardless of the presence or absence of traffic signals.

Figure 2:
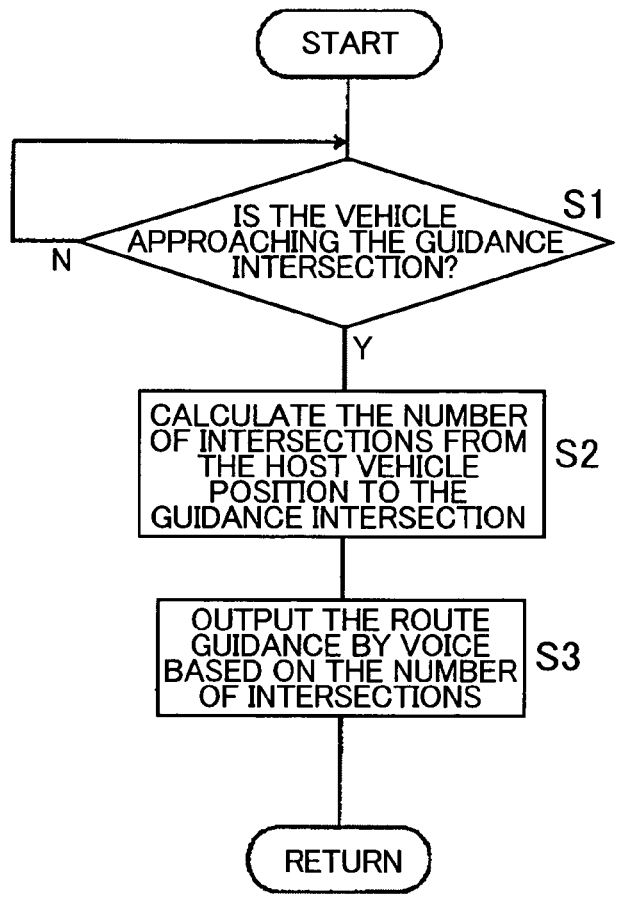
FIG. 2 is a flowchart of the operations of a guidance processing means according to the first embodiment of the present invention.
Figure 3:
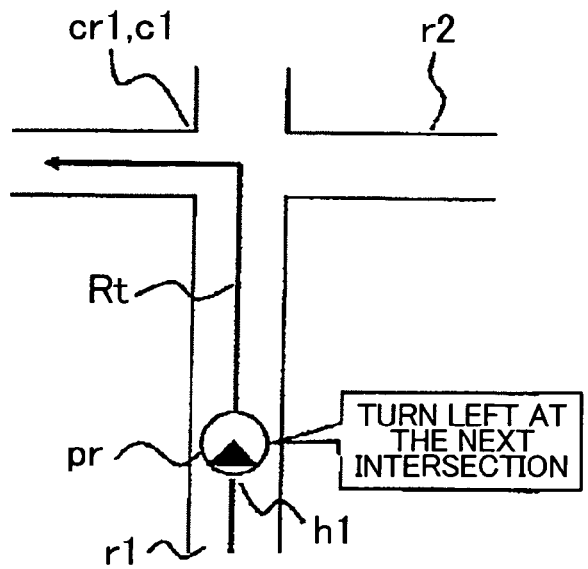
FIG. 3 is a diagram of a first example of guidance processing according to the first embodiment of the present invention.
Figure 4:
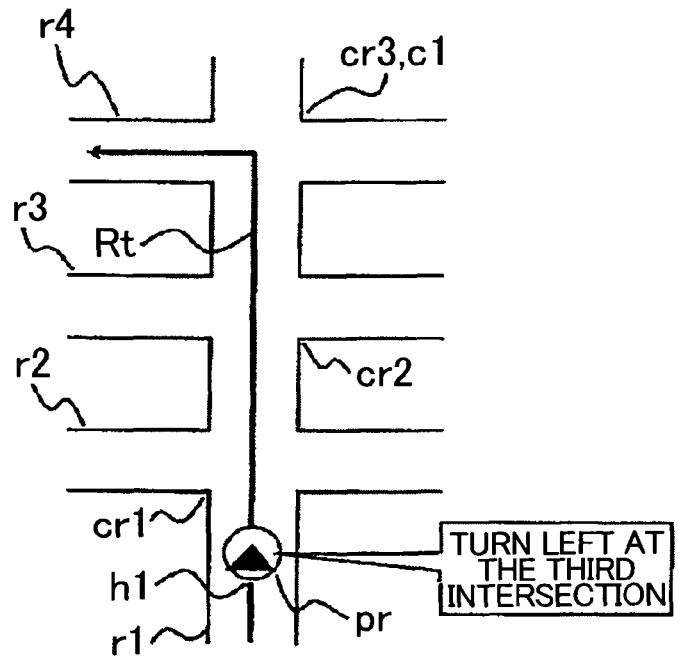
FIG. 4 is a diagram of a second example of guidance processing according to the first embodiment of the present invention.
Figure 5:
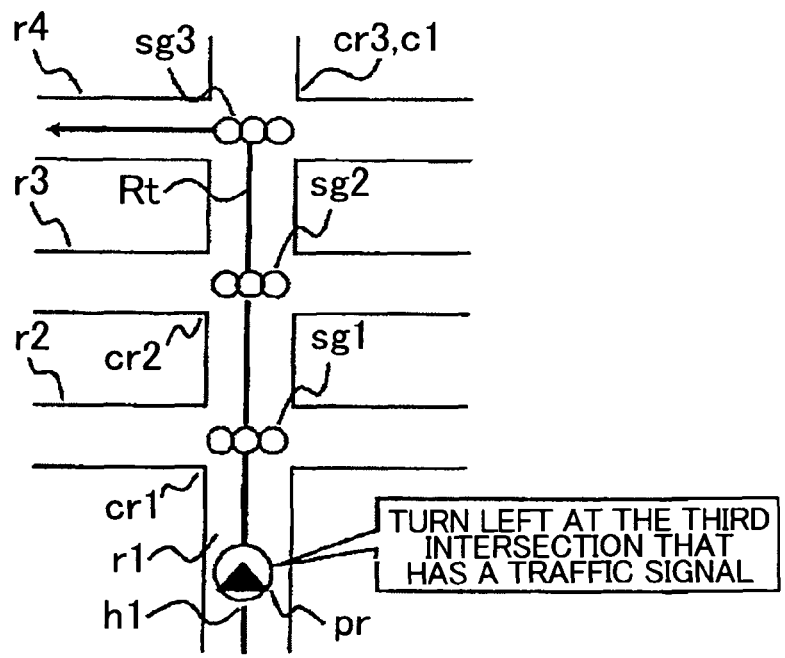
FIG. 5 is a diagram of a third example of guidance processing according to the first embodiment of the present invention.

FIG. 2 is a flowchart of the operations of a guidance processing means according to the first embodiment of the present invention. FIG. 3 is a diagram of a first example of guidance processing according to the first embodiment of the present invention. FIG. 4 is a diagram of a second example of guidance processing according to the first embodiment of the present invention. FIG. 5 is a diagram of a third example of guidance processing according to the first embodiment of the present invention.

In the diagrams, the reference symbol pr denotes the host vehicle location the reference symbols ri (where i=1, 2, ... ) denote roads, the reference symbols crj (where j=1, 2, ... ) denote intersections where two or more specific roads intersect, and the reference symbols sgk (where k=1, 2, ... ) denote traffic signals. Also, the reference symbol Rt denotes the specified route, the reference symbol c1 denotes a guidance intersection that, among the intersections crj, is set as an intersection on the specified route Rt1 where the vehicle is to turn right or left, and the reference symbol h1 denotes a route guidance point that is set on the specified route Rt in advance of the guidance intersection c1.

In FIG. 3, roads r1 and r2 intersect at an intersection cr1. The specified route Rt extends along the road r1 and turns left at the intersection cr1. The intersection cr1 becomes the guidance intersection c1.

In FIG. 4, roads r1 and r2 intersect at an intersection cr1, roads r1 and r3 intersect at an intersection cr2, and roads r1 and r4 intersect at an intersection cr3. The specified route Rt is configured to pass along the road r1 and turn left at the intersection cr3. The intersection cr3 becomes the guidance intersection c1.

In FIG. 5, roads r1 and r2 intersect at an intersection cr1, roads r1 and r3 intersect at an intersection cr2, and roads r1 and r4 intersect at an intersection cr3. The specified route Rt is configured to pass along the road r1 and turn left at the intersection cr3. The intersection cr3 becomes the guidance intersection c1. Also, traffic signals sg1 to sg3 are installed at the intersections cr1 to cr3.

A point arrival determination processing means of the guidance processing means executes point arrival determination processing, determining whether or not the vehicle is approaching the guidance intersection c1 and has arrived at the specified route guidance point h1. If the vehicle has arrived at the specified route guidance point h1, a branch number computation means 74 of the guidance processing means 73 executes branch number computation processing, computing the number of countable branches which are branches that are subject to counting and which, in this embodiment, are the intersections crj. Note that in this embodiment, the guidance intersection c1 is included in the intersections crj that are subject to counting.

Next, the point guidance processing means of the guidance processing means executes point guidance processing, outputting by voice route guidance that is based on the number of the intersections crj.

A traffic signal determination processing means 78 of the guidance processing means 73 executes traffic signal determination processing, determining whether or not a traffic signal exists at the guidance intersection. If a traffic signal exists at the guidance intersection, the point guidance processing means includes the existence of the traffic signal in the route guidance that is based on the number of intersections and outputs the route guidance by voice.

For example, in the example shown in FIG. 3, when the vehicle arrives at the route guidance point h1, the number of the intersections cr1 between the host vehicle position pr and the guidance intersection c1 is computed. In this case, the number of the intersections crj is 1, so the point guidance processing means outputs the route guidance by voice in the form of a message such as "Turn left at the next intersection" or the like.

Also, in the example shown in FIG. 4, when the vehicle arrives at the route guidance point h1, the intersections cr1 to cr3 between the host vehicle location pr and the guidance intersection c1 is computed. In this case, the number of the intersections cr1 to cr3 is 3, so the point guidance processing means outputs the route guidance by voice in the form of a message such as "Turn left at the third intersection".

Also, in the example shown in FIG. 5, when the vehicle arrives at the route guidance point h1, the intersections cr1 to cr3 between the host vehicle location pr and the guidance intersection c1 is computed. In this case, the number of the intersections cr1 to cr3 where traffic signals exist is 3, and a traffic signal sg3 exists at the guidance intersection c1, so the point guidance processing means outputs the route guidance by voice in the form of a message such as "Turn left at the third intersection that has a traffic signal".

Thus, in this embodiment, the route guidance is executed based on the number of the intersections crj between the host vehicle location pr and the guidance intersection c1, so that the driver can recognize the guidance intersection c1 simply by counting the number of the intersections crj, regardless of the number of the traffic signals sgk that exist between the host vehicle location pr and the guidance intersection c1. Even if, for example, there are two traffic signals at one intersection, or there is a traffic signal that provides advance notice of a traffic signal at an intersection, the driver will not fail to recognize the guidance intersection c1.

Also, because all of the intersections crj between the host vehicle location and the guidance intersection are counted, regardless of the presence or absence of traffic signals, the driver will not fail to recognize the guidance intersection c1.

Moreover, even if an intersection exists beyond the guidance intersection c1, the driver will not fail to recognize the guidance intersection c1.

Next, the flowchart of FIG. 2 will be explained.

At step S1, the system waits for the vehicle to approach the guidance intersection c1. If the vehicle is approaching the guidance intersection c1, control passes to step S2.

At step S2, the system computes the number of the intersections crj between the host vehicle location pr and the guidance intersection c1.

At step S3, the route guidance is output by voice based on the number of the intersections crj, and the routine is repeated.

Incidentally, in this embodiment, the branch number computation means 74 computes the number of the intersections crj as the countable branches between the host vehicle location pr and the guidance intersection c1, but the branch number computation means 74 can compute the number of roads that intersect the road r1 as the countable branches between the host vehicle location pr and the guidance intersection c1. Note that in this case, a road that intersects the road r1 at the guidance intersection c1 is also included in the roads that are subject to computation.

Next, the point guidance processing means outputs the route guidance by voice based on the number of roads.

Next, guidance processing will be explained for a second embodiment for a case where at least one of the intersections crj between the host vehicle location pr and the guidance intersection c1 is a T intersection (three-way intersection).

Figure 6:
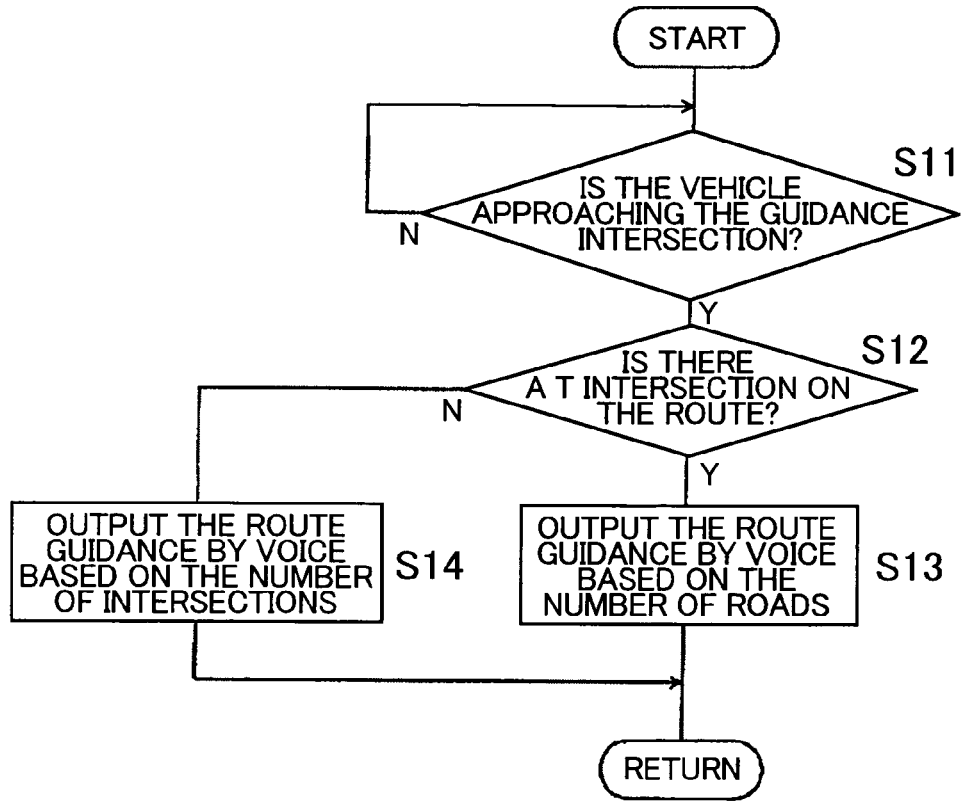
FIG. 6 is a flowchart of the operations of a guidance processing means according to a second embodiment of the present invention.
Figure 7:
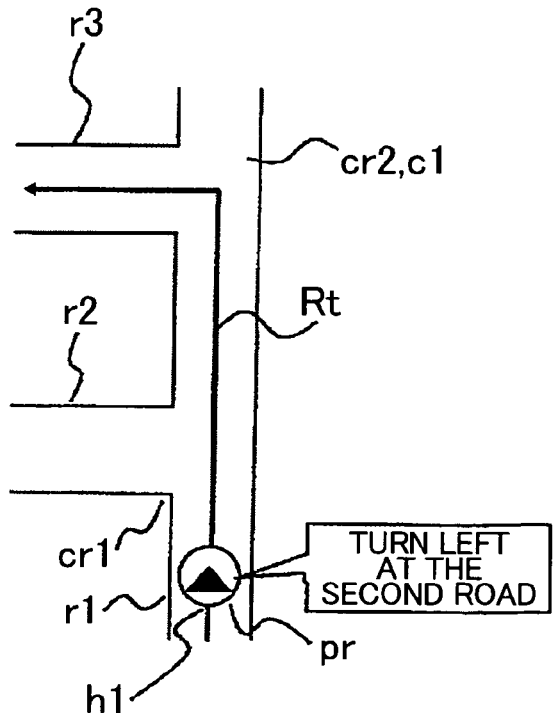
FIG. 7 is a diagram of a first example of guidance processing according to the second embodiment of the present invention.
Figure 8:
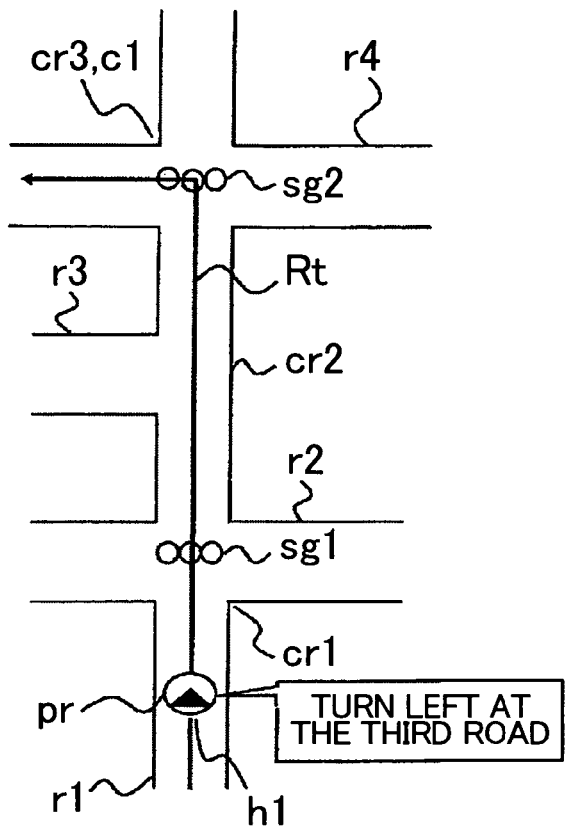
FIG. 8 is a diagram of a second example of guidance processing according to the second embodiment of the present invention.
Figure 9:
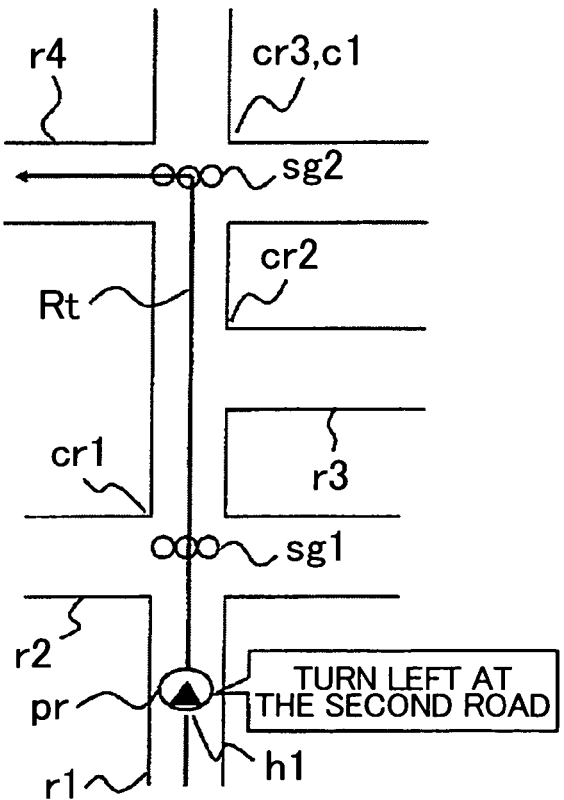
FIG. 9 is a diagram of a third example of guidance processing according to the second embodiment of the present invention.
Figure 10:
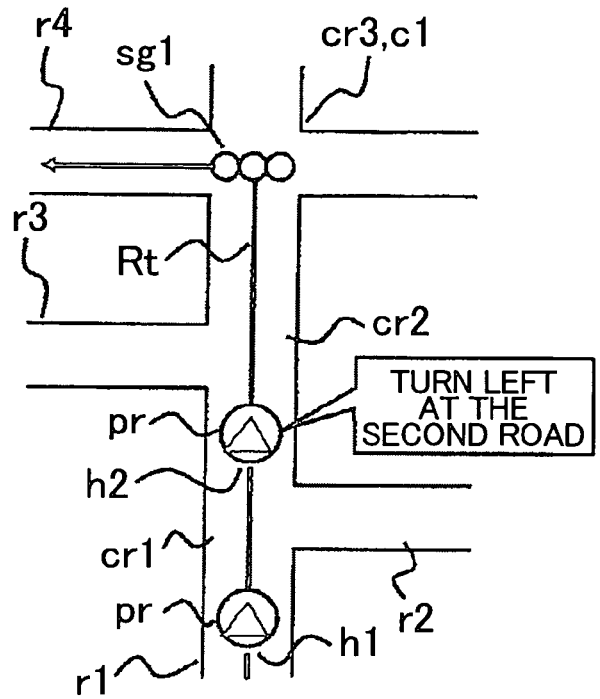
FIG. 10 is a diagram of a fourth example of guidance processing according to the second embodiment of the present invention.

FIG. 6 is a flowchart showing the operation of a guidance processing means according to a second embodiment of the present invention. FIG. 7 is a diagram showing a first example of guidance processing according to the second embodiment of the present invention. FIG. 8 is a diagram showing a second example of guidance processing according to the second embodiment of the present invention. FIG. 9 is a diagram showing a third example of guidance processing according to the second embodiment of the present invention. FIG. 10 is a diagram showing a fourth example of guidance processing according to the second embodiment of the present invention.

In the diagrams, the reference symbol pr denotes the host vehicle location, the reference symbols ri (where i=1, 2, . . . ) denote roads, the reference symbols crj (where j=1, 2, . . . ) denote intersections where two or more specific roads intersect, and the reference symbols sgk (where k=1, 2, . . . ) denote traffic signals. Also, the reference symbol Rt denotes the specified route, the reference symbol c1 denotes a guidance intersection that, among the intersections crj, is set as an intersection on the specified route Rt1 where the vehicle is to turn right or left, and the reference symbols h1, h2 denote route guidance points that are set on the specified route Rt in advance of the guidance intersection c1.

In FIG. 7, roads r1 and r2 intersect at an intersection cr1, and roads r1 and r3 intersect at an intersection cr2. The specified route Rt is configured to pass along the road r1 and turn left at the intersection cr2. The intersection cr2 becomes the guidance intersection c1. Note that the intersections cr1, cr2 are T intersections and that the roads r2, r3 extend in the same direction as the road exiting from the guidance intersection c1.

In FIG. 8, roads r1 and r2 intersect at an intersection cr1, roads r1 and r3 intersect at an intersection cr2, and roads r1 and r4 intersect at an intersection cr3. The specified route Rt passes along the road r1 and turns left at the intersection cr3. The intersection cr3 becomes the guidance intersection c1. Note that the intersections cr1, cr3 are full intersections (four-way intersections), that the intersection cr2 is a T intersection, and that the roads r2 to r4 extend in the same direction as the exit road from the guidance intersection c1. Also, traffic signals sg1, sg2 are installed at the intersections cr1, cr3.

In FIG. 9, roads r1 and r2 intersect at an intersection cr1, roads r1 and r3 intersect at an intersection cr2, and roads r1 and r4 intersect at an intersection cr3. The specified route Rt passes along the road r1 and turns left at the intersection cr3. The intersection cr3 becomes the guidance intersection c1. Note that the intersections cr1, cr3 are full intersections, that the intersection cr2 is a T intersection, that the roads r2, r4 extend in the same direction as the exit road from the guidance intersection c1, and that the road r3 extends in the opposite direction from the exit road from the guidance intersection c1. Also, traffic signals sg1, sg2 are installed at the intersections cr1, cr3.

In FIG. 10, roads r1 and r2 intersect at an intersection cr1, roads r1 and r3 intersect at an intersection cr2, and roads r1 and r4 intersect at an intersection cr3. The specified route Rt passes along the road r1 and turns left at the intersection cr3. The intersection cr3 becomes the guidance intersection c1. Note that the intersection cr3 is a full intersection, that the intersections cr1, cr2 are T intersections, that the roads r3, r4 extend in the same direction as the exit road from the guidance intersection c1, and that the road r2 extends in the opposite direction from the exit road from the guidance intersection c1. Also, a traffic signal sg1 is installed at the intersection cr3.

In these cases, the point arrival determination processing means determines whether or not the vehicle is approaching the guidance intersection c1 and has arrived at the specified route guidance point h1. If the vehicle has arrived at the specified route guidance point h1, an intersection determination processing means of the guidance processing means executes intersection determination processing, determining whether or not a T intersection exists between the host vehicle location pr and the guidance intersection c1.

If a T intersection does not exist, the branch number computation means 74 computes the number of the intersections crj as the countable branches between the host vehicle location pr and the guidance intersection c1, in the same manner as in the first embodiment. Next, the point guidance processing means outputs the route guidance by voice based on the number of the intersections crj. Note that in a case where the presence or absence of a traffic signal at the guidance intersection is determined and a traffic signal exists at the guidance intersection, the existence of the traffic signal can be included in the route guidance that is based on the number of intersections.

On the other hand, if a T intersection does exist, the branch number computation means 74 computes, as the countable branches between the host vehicle position pr and the guidance intersection c1, the number of roads that extend in the same direction as the exit road from the guidance intersection c1. Note that in this embodiment, a road that intersects the road r1 at the guidance intersection c1 is also included in the roads that are subject to counting.

Next, the point guidance processing means outputs the route guidance by voice based on the number of roads.

If a road that extends in the opposite direction from the exit road from the guidance intersection c1 exists between the route guidance point h1 and the closest road to the host vehicle location pr, i.e. closest among the roads that extend in the same direction as the exit road from the guidance intersection c1, the possibility exists that the driver will mistakenly think that intersection is the guidance intersection. Therefore, a specific branch determination processing means 79 of the guidance processing means executes specific branch type determination processing, determining whether or not a specific type of branch exists that might be counted by mistake. If the specific branch exists, a delay processing means 80 of the guidance processing means executes delay processing, delaying the route guidance, then outputting the route guidance by voice after the vehicle has passed the specific branch.

For example, in the example shown in FIG. 7, when the vehicle arrives at the route guidance point h1, the number of the roads r2, r3 between the host vehicle location pr and the guidance intersection c1 that extend in the same direction as the exit road from the guidance intersection c1 is computed. In this case, the number of the roads r2, r3 is 2, so the point guidance processing means 77 outputs the route guidance by voice in the form of a message such as "Turn left at the second road".

In the example shown in FIG. 8, when the vehicle arrives at the route guidance point h1, the number of the roads r2 to r4 between the host vehicle location pr and the guidance intersection c1 that extend in the same direction as the exit road from the guidance intersection c1 is computed. In this case, the number of the roads r2 to r4 is 3, so the point guidance processing means 77 outputs the route guidance by voice in the form of a message such as "Turn left at the third road".

In the example shown in FIG. 9, when the vehicle arrives at the route guidance point h1, the number of the roads r2, r4 between the host vehicle location pr and the guidance intersection c1 that extend in the same direction as the exit road from the guidance intersection c1 is computed. In this case, the number of the roads r2, r4 is 2, so the point guidance processing means 77 outputs the route guidance by voice in the form of a message such as "Turn left at the second road".

In the example shown in FIG. 10, when the vehicle arrives at the route guidance point h1, the number of the roads r3, r4 between the host vehicle location pr and the guidance intersection c1 that extend in the same direction as the exit road from the guidance intersection c1 is computed. In this case, the number of the roads r3, r4 is 2, so it is possible for the point guidance processing means 77 to output the route guidance by voice at the route guidance point h1 in the form of a message such as "Turn left at the second road". However, the road r2, which extends in the opposite direction from the exit road from the guidance intersection c1, is present between the route guidance point h1 and the road r3, which, of the roads r3, r4 that extend in the same direction as the exit road from the guidance intersection c1, is the closest road to the host vehicle location pr. Therefore, the possibility exists that the driver will mistakenly think that the intersection cr2 is the guidance intersection. Accordingly, the system outputs the route guidance by voice in the form of a message such as "Turn left at the second road" at the route guidance point h2, only after the vehicle has passed the route guidance point h1 and has passed the intersection cr1.

Thus, in this embodiment, the system determines whether or not a T intersection exists between the host vehicle location pr and the guidance intersection c1. If a T intersection does not exist there, the route guidance is executed based on the number of the intersections crj. If a T intersection does exist there, the route guidance is executed based on the number of the roads. Therefore, the driver is able to recognize the guidance intersection c1 simply by counting the number of the intersections crj or the number of the roads, regardless of the number of the traffic signals sgk that exist between the host vehicle location pr and the guidance intersection c1.

Next, the flowchart in FIG. 6 will be explained.

At step S11, the system waits for the vehicle to approach the guidance intersection c1. If the vehicle has approached the guidance intersection c1, control passes to step S12.

At step S12, the system determines whether or not a T intersection exists. If a T intersection exists, control passes to step S13. If a T intersection does not exist, control passes to step S14.

At step S13, the route guidance is output by voice based on the number of the roads ri, and the routine is repeated.

At step S14, the route guidance is output by voice based on the number of the intersections crj, and the routine is repeated.

However, in each of the embodiments described above, the route guidance for the guidance intersection c1 is displayed by using the number of intersections or the number of roads that are present between the location of the host vehicle and the guidance intersection c1 at each of the route guidance points h1, irrespective of the presence of a traffic signal skg, and the route guidance is output by voice using a message such as "turn left at the second road".

However, while the route guidance is being output by voice, as the location of the host vehicle changes with of the vehicle, the driver may become confused about whether the vehicle has reached the guidance intersection c1 according to the route guidance when counting from any given intersection or any given road.

Thus, the present invention provides a third embodiment in which the route guidance by voice can be carried out selectively depending on the situation in the vicinity of the vehicle. Note that elements having structures that are identical to those of the first and second embodiments are denoted by identical reference symbols, and this embodiment incorporates the effects of the invention that derive from having the identical structure.

Figure 11:
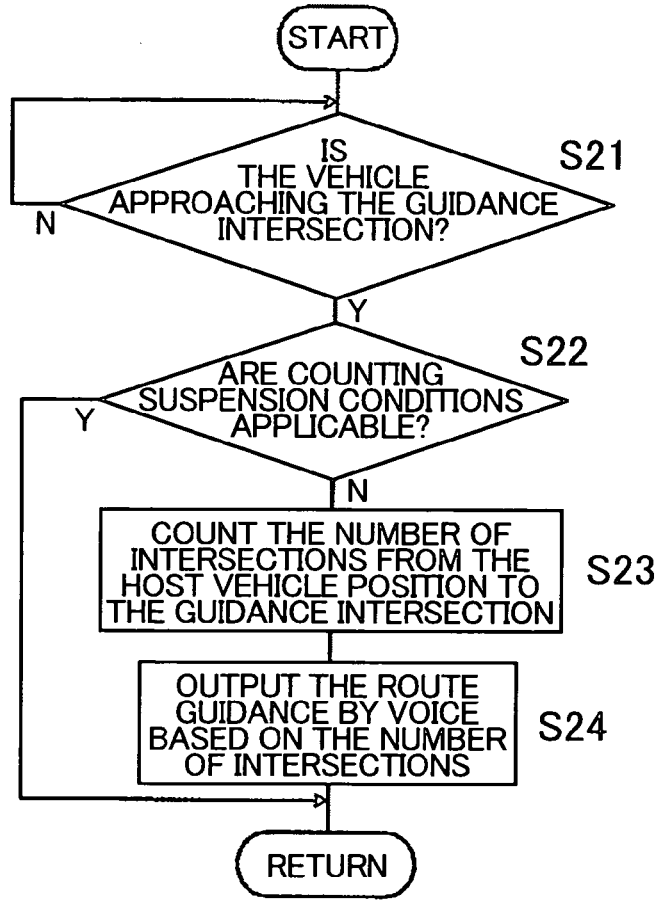
FIG. 11 is a flowchart of the operations of a guidance processing means according to a third embodiment of the present invention.
Figure 12:
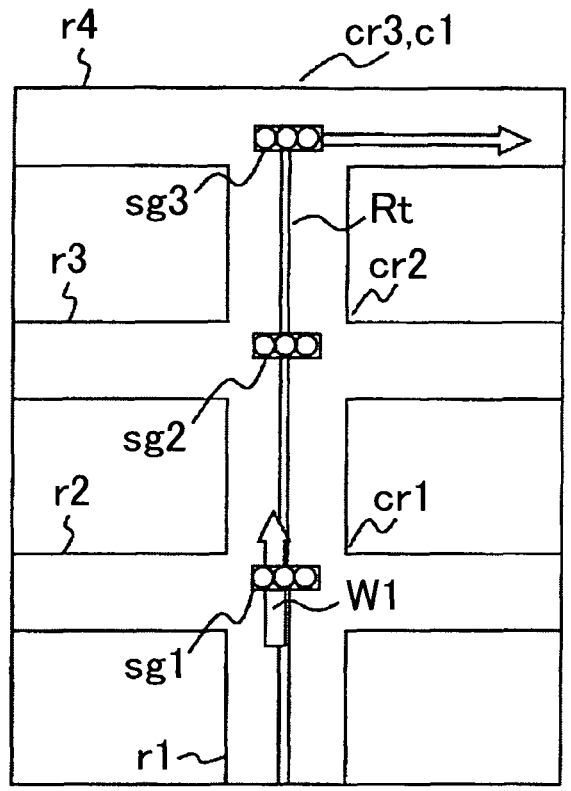
FIG. 12 is a diagram showing an example of guidance processing according to the third embodiment of the present invention.

FIG. 11 is a flowchart showing the operation of a guidance processing means according to the third embodiment of the present invention, and FIG. 12 is a diagram showing an example of guidance processing according to the third embodiment of the present invention.

In the diagrams, ri (i=1, 2, ... ) denotes roads, crj a=1, 2, ... ) denotes intersections at which two or more specified roads intersect, and sgk (k=1, 2, ... ) denotes traffic signals. In addition, Rt denotes the specified route, and c1 is a guidance intersection at which, among the intersections crj, the specified route Rt1 has been set such that the vehicle is to turn right or left.

In this case, roads r1 and r2 intersect at intersection cr1, roads r1 and r3 intersect at the intersection cr2, and roads r1 and r4 intersect at the intersection cr3, the specified route Rt transits the road r1, a right turn is made at the intersection cr3, and the intersection cr3 serves as the guidance intersection c1. In addition, signals sg1 to sg3 are respectively provided at the intersections cr1 to cr3.

In this embodiment, similar to each of the embodiments described above, first, the point arrival determination processing means of the route processing means determines whether or not the vehicle is approaching the guidance intersection c1, and has arrived at a specified route guidance point.

In this connection, in each of the embodiments described above, when the vehicle is approaching the guidance intersection c1 and has arrived at a specified route guidance point, the branch number computation means 74 of the guidance processing means 73 computes the countable branching elements, for example, the number of intersections crj, between the location of the host vehicle and the guidance intersection c1. However, as described above, while route guidance is being output by voice, as the position of the host vehicle changes with travel of the vehicle, there are cases in which, when counting from a given intersection or a given road, the driver may be confused about whether the vehicle has arrived at the guidance intersection c1 according to the route guidance.

Thus, in the present embodiment, in a case in which it can be anticipated that the number of intersections crj that are counted by the branch number computation means 74 will be different from the number of intersections crj that are counted by the driver when provided with route guidance, the counting suspension processing means of the route processing means carries out counting suspension processing, and the counting of the number of intersections crj is suspended. Note that the guidance suspension processing means 82 is in the form of counting suspension processing means, the guidance suspension processing means 82 carries out the guidance suspension processing, and the route guidance is suspended by suspending the counting.

Thus, in the case in which the vehicle has arrived at the specified route guidance point, the counting suspension conditions determination processing means of the guidance processing means carries out counting suspension conditions determination processing, and determines whether or not suspending the counting of the number of intersections crj is preferable, that is, whether or not the suspension conditions are applicable. Note that the guidance suspension conditions determination processing means is the counting suspension conditions determination processing means, and the guidance suspension conditions determination processing means carries out the guidance suspension conditions determination processing and determines whether or not suspending the route guidance based on the number of the intersections crj is preferable, that is, whether or not the guidance suspension conditions are applicable.

As shown in FIG. 12, when the vehicle arrives at a specified route guidance point in advance of the intersection cr1, the branch number computation means 74 computes the number of intersections crj between the location of the host vehicle and the guidance intersection c1. In the case in which the vehicle travels as indicated by the arrow W1 and transits the intersection cr1 while the point guidance processing means 77 is outputting a voice message such as "turn right at the third road", the number of intersections crj between the location of the host vehicle and the intersection crj changes between the time that the voice output starts and the time that the voice output is finished Therefore, it is difficult for the driver to determine whether or not the number of intersections crj is to be counted by including the intersection cr1 or is to be counted without including the intersection cr1. Therefore, when it has been determined that counting is to be carried out by including the intersection cr1, the driver turns right at the intersection cr3, and when it has been determined that counting is to be carried out without including the intersection cr1, the driver turns left at one intersection ahead of the intersection cr3, and it becomes impossible to accurately follow the specified route Rt.

Thus, in the present embodiment, the counting suspension conditions determination processing means computes the distance that the vehicle will travel while the route guidance is being output by voice, that is, the announcement period travel distance Ls, determines whether or not the intersection crj is present within this announcement period travel distance Ls, and in the case in which the intersection crj is present therein, determines that the counting suspension conditions are applicable.

In order to carry out the above process, the counting suspension interval computation processing means of the counting suspension conditions determination processing means carries out the counting suspension interval computation processing, reads the vehicle speed v from the vehicle speed sensor 44 (FIG. 1), and computes the interval during which the count is suspended, that is, the announcement period travel distance Ls that represents the counting suspension interval. Note that the guidance suspension interval computation processing means is the counting suspension interval computation processing means, and this guidance suspension interval computation processing means carries out guidance suspension interval computation processing and computes the interval during which the route guidance is suspended based on the number of the intersections crj, that is, the announcement period travel distance Ls that represents the guidance suspension interval.

In this case, when the route guidance is output by voice, where the time from the start to the end of the voice guidance output is denoted by the announcement time la, the announcement period travel distance Ls is:

$$Ls = \tau a \times v.$$

Next, the branch determination processing means of the counting suspension conditions determination processing means executes branch determination processing, in which the location of the host vehicle is read, and at the same time, the intersection data (the coordinates of the intersection, the width of the intersection in the forward direction, and the like) is read out from the data storage portion 16, and when the voice output starts, determines whether or not an intersection crj is present within the counting suspension interval (the interval from the location of the host vehicle within the announcement period travel distance Ls), and in the case in which an intersection crj is present, it is determined that the counting suspension conditions are applicable.

For example, when the announcement time τa is 5 [s] and the vehicle speed v is 40 [km/h], the speed per second is about 11 [m/s], and thus the announcement period travel distance Ls is:

$$La = 5 \text{ [s]} \times 11 \text{ [m/s]} = 55 \text{ [m]}.$$

In another example, when the vehicle speed v is 60 [km/h], and the speed per second is about 17 [m/s], and thus the announcement period travel distance Ls is:

$$Ls = 5 \text{ [s]} \times 17 \text{ [m/s]} = 85 \text{ [m]}.$$

In this manner, in the present embodiment, in the case in which an intersection crj is present within the announcement period travel distance Ls, it is possible to drive the vehicle with high precision along the specified route Rt because the counting of the number of intersections crj is suspended.

Note also that in this case, when the vehicle is driven from the location of the host vehicle beyond the announcement period travel distance Ls, the counting suspension conditions are terminated.

Next, the flowchart of FIG. 11 will be explained.

At step S21, the system waits for the vehicle to approach the guidance intersection c1. If the vehicle is approaching the guidance intersection c1, control passes to step S22.

At step S22, whether or not the counting suspension conditions are applicable is determined. If the counting suspension conditions are not applicable, control passes to step S23, and if the counting suspension conditions are applicable, control returns.

At step S23, the number of intersections crj from the location of the host vehicle to the guidance intersection c1 is counted.

At step S24, the route guidance is output by voice based on the number of intersections, and then the routine is repeated.

Next, a fourth embodiment of the present invention will be explained. Note that elements having structures that are identical to those of the third embodiment are denoted by identical reference symbols, and this embodiment incorporates the effects of the invention that derive from having those identical structures.

Figure 13:
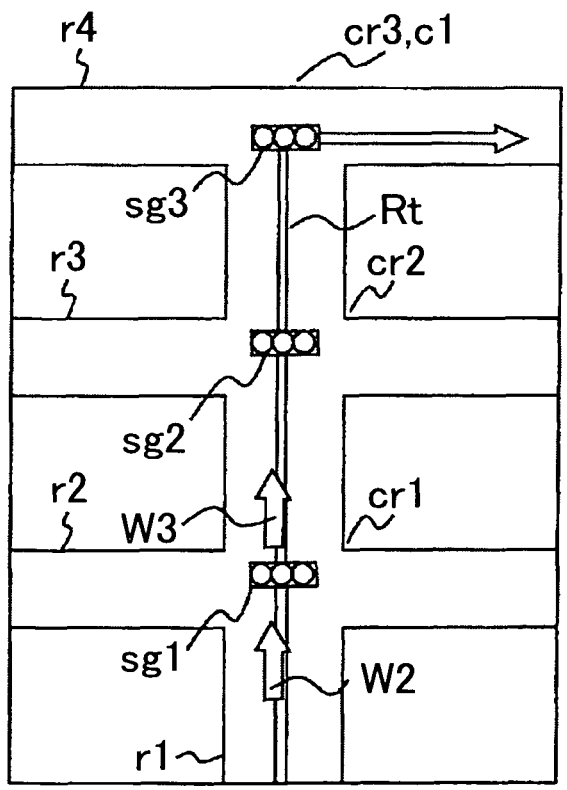
FIG. 13 is a diagram showing an example of guidance processing according to a fourth embodiment of the present invention.

FIG. 13 is a diagram showing an example of the guidance processing according to the fourth embodiment of the present invention.

In FIG. 13, when the vehicle arrives at a specified route guidance point in advance of the intersection cr1, the branch number computation means 74 computes the number of intersections crj between the location of the host vehicle and the guidance intersection c1. While the point guidance processing means is outputting a voice message such as "turn right at the third intersection", when the vehicle travels as shown by the arrows W2 and W3 and an intersection cr1 is present in proximity to the point at which the voice output ends, it is difficult to determine the number of the intersections crj at any given point in time. In this case as well, it is difficult for the driver to determine whether the number of intersections crj is to be counted by including the intersection cr1, or is to be counted without including the intersection cr1.

Thus, in the present embodiment, the counting suspension conditions determination processing means computes the announcement period travel distance Ls, determines whether or not an intersection crj is present in proximity to the arrival point after traveling through the announcement period travel distance Ls, and in the case in which an intersection crj is present, determines that the counting suspension conditions are applicable.

In order to execute the above-described routine, the counting suspension interval computation processing means of the counting suspension conditions determination processing means reads the vehicle speed v from the vehicle speed sensor 44, and computes the announcement period travel distance Ls.

In this case, when the route guidance is output by voice, where the time from the start to the finish of the voice output is the announcement time τa, then the announcement period travel distance Ls is:

$$Ls = \tau a \times v.$$

In addition, the counting suspension interval computation processing means adds a buffer distance dLs for establishing a margin in the announcement period travel distance Ls such that the driver does not need to count the intersections crj in the case in which the vehicle is sufficiently separated from an intersection crj, and then computes the counting suspension distance Lst, which represents the count suspension interval:

$$Lst = Ls + dLs.$$

Note that the guidance suspension distance is the counting suspension distance Lst.

Next, the branch determination processing means reads the location of the host vehicle, and at the same time, reads the intersection data (the coordinates of the intersection, the width of the intersection in the forward direction, and the like) from the data storage portion 16, and when the voice output starts, it is determined whether or not an intersection crj is present in the counting suspension interval (the interval between the location of the host vehicle within the counting suspension distance Lst), and in the case in which an intersection crj is present, it is determined that that counting suspension conditions are applicable.

For example, when the announcement time τa is 5 [s] and the vehicle speed v is 40 [km/h], then the speed per second is about 11 [m/s], and thus the announcement period travel distance Ls is:

$$Ls = 55 \ [m].$$

Likewise, when the buffer distance dLs is 50 [m], then the counting suspension distance Lst is 105 [m].

In this manner, in the present embodiment, in the case in which an intersection crj is present within the counting suspension distance Lst, because the counting of the number of intersections crj is suspended, it is possible drive the vehicle with high precision along the specified route Rt.

Note that in this case, when the vehicle has been driven beyond the counting suspension distance Lst, the counting suspension conditions are terminated.

As shown in FIG. 13, also in the case in which the intersection cr1 is separated less than the buffer distance from the intersection immediately ahead, it is difficult for the driver to determine whether the number of intersections crj is to be counted by including the intersection cr1, or is to be counted without including the intersection cr1.

Thus, the counting suspension conditions determination processing means computes the distance between the intersection cr1 and the intersection immediately ahead, that is, the inter-intersection distance Lc, and in the case that the inter-intersection distance Lc is shorter than the buffer distance dLs, also determines that the counting suspension conditions are applicable.

In order to execute the above routine, the inter-intersection distance determination processing means of the counting suspension conditions determination processing means carries out inter-intersection distance determination processing, reads the intersection data (the coordinates of the intersection, the width of the intersection in the forward travel direction) from the data storage portion 16, computes the distance between the intersection cr1 and the intersection immediately ahead, that is, the inter-intersection distance Lc, and determines whether or not the inter-intersection distance Lc is shorter than the buffer distance dLs.

In addition, in the case in which the inter-intersection distance Lc is shorter than the buffer distance dLs, the branch determination processing means determines that the intersection crj is within the counting suspension interval, and determines that the counting suspension conditions are applicable.

In this manner, in the case in which the inter-intersection distance Lc is shorter than the buffer distance dLs, because the counting of the number of the intersections crj is suspended, it is possible for the vehicle to accurately follow along the specified route Rt.

Note that in this case, when the vehicle has been driven beyond the buffer distance dLs, the counting suspension conditions are terminated.

Next, a fifth embodiment of the present invention will be explained. Note that elements having structures that are identical to those of the third and fourth embodiments are denoted by identical reference symbols, and this embodiment incorporates the effects of the invention that derive from having the identical structure.

Figure 14:
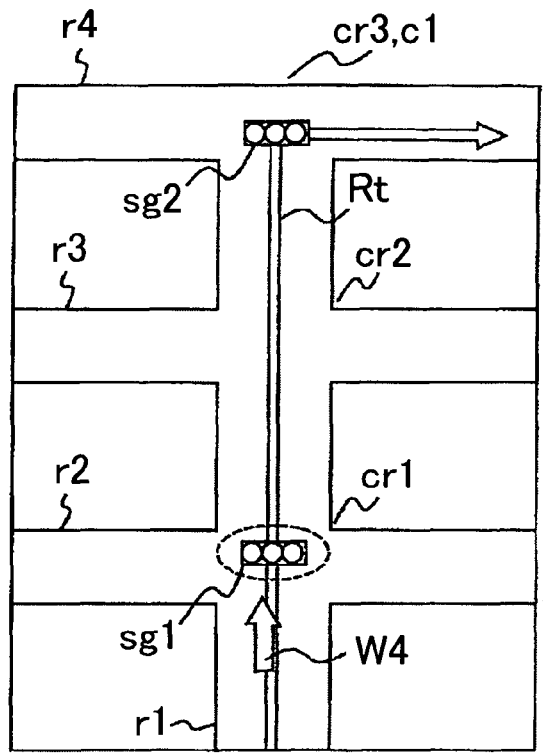
FIG. 14 is a diagram showing an example of guidance processing according to a fifth embodiment of the present invention.

FIG. 14 is a diagram showing an example of guidance processing according to the fifth embodiment of the present invention.

In this embodiment, as shown in FIG. 14, for example, the vehicle arrives at a specified route guidance point in advance of the intersection cr1, the branch computation processing means computes the number of intersections crj between the location of the host vehicle and the guidance intersection c1.

While the point guidance processing means is outputting a voice message such as "turn right at the third intersection", the vehicle continues to travel as is shown by the arrow W4. When a plurality of intersections crj is present from the point at which the voice output finishes, in this case as well, it may be difficult for the driver to determine whether the number of intersections crj is to be counted by including the intersection cr1, or is to be counted without including the intersection cr1.

Thus, in this fifth embodiment, the counting suspension conditions determination processing means computes the announcement period travel distance Ls, determines whether or not a plurality of intersections crj is present between the point where the voice output is to end ("arrival point") and the guidance intersection c1 while the vehicle is traveling through the announcement period travel distance Ls, and in the case in which the vehicle intersections crj are present, determines that the counting suspension conditions are applicable.

In order to provide the above function, the counting suspension interval computation processing means of the counting suspension conditions processing means reads the vehicle speed v from the vehicle speed sensor 44, and computes the announcement period travel distance Ls. In this case, when the route guidance is output by voice, where the time from the start to the finish of the output is the announcement time $\tau a$, the announcement period travel distance Ls is:

$$Ls = \tau a \times v.$$

Next, the branch determination processing means reads the intersection data (coordinates of the intersection, width of the intersection in the forward travel direction) from the data storage portion 16 (FIG. 1), and when starting the voice output, where the end point of the announcement period travel distance Ls is set as the arrival point, determines whether or not a plurality of intersections crj is present between the arrival point and the guidance intersection c1, and in the case in which a plurality of intersections crj is present, determines that the counting suspension conditions are applicable.

In this manner, in the case in which a plurality of intersections crj is present in the interval between the arrival point and the guidance intersection c1 when traveling the announcement period travel distance Ls, because the counting of the number of intersections crj is suspended, the voice guidance is output in the case in which only one intersection cr3 (guidance intersection c1) is present in the interval between the arrival point and the guidance intersection c1.

Note that in this case, when the vehicle has been driven beyond the guidance point c1, the counting suspension conditions are terminated.

However, in each of the embodiments described above, although the counting suspension conditions are terminated while traveling to a specified point, in the case in which the detection precision for the location of the host vehicle by the GPS sensor 15 (FIG. 1) is low, there may be cases in which the counting is normally executed at locations where the counting should be suspended, because the counting suspension conditions have been terminated, and route guidance is output by voice.

Thus, in a sixth embodiment of the present invention the counting is not carried out at locations at which the counting should be suspended. Note that elements having structures that are identical to those of the third through fifth embodiments are denoted by identical reference symbols, and this embodiment provides the effects of the invention that derive from having such identical structure. The present embodiment, will be described in terms of an example that factors in the detection error in the location of the host vehicle in suspending the counting in the third embodiment of the present invention. However, in other embodiments, it is also possible to factor in the detection error of the location of the host vehicle.

Figure 15:
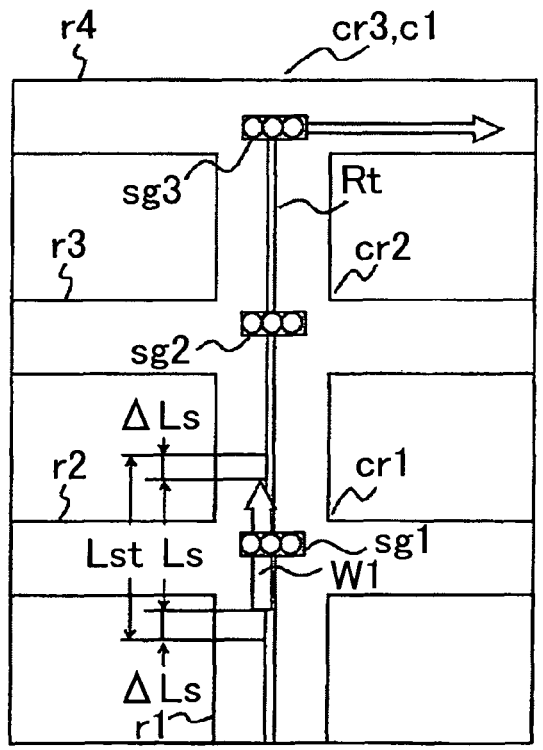
FIG. 15 is a diagram showing an example of guidance processing according to a sixth embodiment of the present invention.

FIG. 15 is a diagram of the example of guidance processing according to the sixth embodiment of the present invention.

In this case, the counting suspension conditions determination processing means sets a detection error $\Delta Ls$ for the location of the host vehicle in front of and in back of the announcement period travel distance Ls. Therefore, in the present embodiment, the counting suspension interval computation processing means of the counting suspension conditions determination processing means reads the vehicle speed v from the vehicle speed sensor 44, computes the announcement period travel distance Ls, adds the detection error $\Delta Ls$ for establishing a margin in front of and in back of the announcement period travel distance Ls, and computes the counting suspension distance Lst, which represents the counting suspension interval:

$$Lst = Ls + 2\Delta Ls.$$

Next, the branch determination processing means reads the location of the host vehicle, and at the same time, reads the intersection data (the coordinates of the intersection, the width of the intersection in the forward direction, and the like) from the data storage portion 16, and when the voice output starts, determines whether or not an intersection crj is present in the counting suspension interval (the interval between the location of the host vehicle and the end of the counting suspension distance Lst), and in the case in which an intersection crj is present, determines that the counting suspension conditions are applicable.

Note that the present invention is not limited to the embodiments described above. Various modifications can be made based on the purpose of the present invention, and it is intended that all modifications within the spirit and scope of the present invention be included.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embrace therein.

We claim:

1. A route guidance system, comprising:
   a current location detection section that detects a current location of a host vehicle as a host vehicle location;
   route search processing means for searching for a route to a destination, based on the detected host vehicle location and for specifying the route determined by a search as a specified route; and
   guidance processing means for settling a route guidance point at a specified location on the specified route in advance of a guidance location for which route guidance is to be provided and that executes route guidance for the guidance location when the vehicle arrives at the route guidance point, wherein
   the guidance processing means includes:
   branch number computation means for computing the number of branches in the specified route between the host vehicle and the guidance location;
   point guidance processing means for outputting route guidance by voice to a driver of the host vehicle, based on the computed number of the branches, during an announcement time period extending from the start to the end of the outputting of the route guidance by voice, when the host vehicle comes to the set route guidance point;

vehicle speed detection means for detecting speed of the host vehicle;

guidance suspension conditions determination processing means for determining whether or not guidance suspension conditions are applicable, based on an announcement period travel distance that is computed based on the announcement time period and the vehicle speed, wherein the guidance suspension conditions are determined to be applicable when the route guidance point is within the announcement time period travel distance; and guidance suspension processing means for, responsive to a determination that the guidance suspension conditions are applicable, suspending the route guidance which is based on the computed number of branches.

2. The route guidance system according to claim 1, wherein the branches are intersections.

3. The route guidance system according to claim 1, wherein the branches are junctions with roads.

4. The route guidance system according to claim 3, wherein the roads are roads that extended in the same direction as an exit road from the guidance location.

5. The route guidance system according to claim 1, wherein the guidance processing means includes a traffic signal determination processing means that determines whether or not a traffic signal exists at the guidance location; and if a traffic signal is determined to exist at the guidance location, the point guidance processing means includes the existence of the traffic signal in the route guidance that is based on the number of the branches.

6. The route guidance system according to claim 1, wherein the guidance processing means includes a specific branch determination processing means for determining whether or not a specific type of branch is present between the host vehicle location and the guidance location that the driver might possibly count by mistake; and the guidance processing means includes a delay processing means for, responsive to a determination that a branch of the specific type is present, delaying the route guidance, then executing the route guidance after the vehicle has passed the branch of the specific type.

7. A route guidance method, comprising the steps of:

detecting a current location of a host vehicle as a host vehicle location;

detecting speed of the host vehicle;

searching for a route to a destination, based on the host vehicle location and search data read from data storage, setting a route determined by the searching as a specified route, and outputting route data that describes the specified route;

based on the output route data, identifying a guidance location for which route guidance is to be provided;

setting a route guidance point at a specified location on the specified route in advance of the guidance location for which route guidance is to be provided;

computing the number of branches in the specified route, between the host vehicle location and the guidance location;

outputting route guidance for the guidance location by voice to a driver of the host vehicle during an announcement time period when the vehicle arrives at the route guidance point, based on the computed number of branches, when the host vehicle comes to the set route guidance point, the announcement time period extending from the start to the end of the outputting of the route guidance by voice;

determining whether or not guidance suspension conditions are applicable, based on an announcement time period travel distance that is computed based on the announcement time period and the vehicle speed, wherein the guidance suspension conditions are determined to be applicable when the route guidance point is within the announcement time period travel distance; and suspending the route guidance based on the computed number of branches responsive to a determination that the guidance suspension conditions are applicable.

* * * * *